United States Patent
Ko et al.

(10) Patent No.: US 7,390,476 B2
(45) Date of Patent: Jun. 24, 2008

(54) CARBON FIBER PAPER CONSTRUCTION AND MANUFACTURING PROCESS

(75) Inventors: Tse-Hao Ko, Taichung (TW); Yuan-Kai Liao, Taichung (TW)

(73) Assignee: Feng Chia University, Taichung (TW)

( * ) Notice: Subject to any disclaimer, the term of this patent is extended or adjusted under 35 U.S.C. 154(b) by 336 days.

(21) Appl. No.: 11/331,214

(22) Filed: Jan. 13, 2006

(65) Prior Publication Data

US 2006/0214320 A1 Sep. 28, 2006

(30) Foreign Application Priority Data

Mar. 25, 2005 (TW) .............................. 94109419 A

(51) Int. Cl.
*D01F 9/12* (2006.01)
(52) U.S. Cl. .................... 423/447.2; 423/447.1; 428/408
(58) Field of Classification Search ................. 428/408; 423/447.2, 447.1; 429/233, 234, 235, 236, 429/237, 241, 245
See application file for complete search history.

(56) References Cited

U.S. PATENT DOCUMENTS

| | | | | | |
|---|---|---|---|---|---|
| 6,156,287 | A | * | 12/2000 | Ko | 423/447.1 |
| 6,713,034 | B2 | * | 3/2004 | Nakamura et al. | 423/447.2 |
| 6,812,171 | B2 | * | 11/2004 | Shimazaki et al. | 442/337 |
| 2005/0124246 | A1 | * | 6/2005 | Ko | 442/202 |
| 2006/0214320 | A1 | * | 9/2006 | Ko et al. | 264/29.2 |
| 2007/0154779 | A1 | * | 7/2007 | Ko et al. | 429/44 |

* cited by examiner

*Primary Examiner*—N Edwards
(74) *Attorney, Agent, or Firm*—Rosenberg, Klein & Lee

(57) ABSTRACT

A carbon fiber paper manufacturing process and construction has oxidized fiber as raw material needle punched into a construction of 0.1~20 mm thick, 5~500 g/m2 oxidized fiber felt of weight, then impregnated in high density epoxy, hot compressed and hardened, then finally carbonization processed at temperature range of 700~3000° C. to yield porous carbon fiber paper with high resilience, low porosity, and flexure, and low surface resistance to be used as the substrate of porous carbon electrode in fuel battery.

5 Claims, 3 Drawing Sheets

Felt making

Resin Impregnation

Hot Compression Hardening

Carbonization Treatment

Finished Product

Felt making

Resin Impregnation

Hot Compression Hardening

Carbonization Treatment

Finished Product

| | Thickness (mm) | Density (g/cm³) | Flexural Strength (MPa) | Elasticity Modulus (MPa) | Flexure (mm) | Surface Resistivity* (Ω/sq) | Air Permeability (cm³/cm²/s) | Porosity % |
|---|---|---|---|---|---|---|---|---|
| PE 1 | 0.67 | 1.8842 | 9.24 | 291.44 | 2.11 | 0.291 | 9.33 | 62.23 |
| PE 2 | 062 | 1.8977 | 879 | 277.85 | 1.94 | 0.254 | 9.22 | 58.12 |
| PE 3 | 0.50 | 1.7725 | 23.66 | 778.93 | 2.34 | 0.301 | 8.39 | 41.99 |
| PE 4 | 0.65 | 1.7609 | 4.40 | 135.01 | 1.93 | 0.316 | 6.33 | 56.97 |
| PE 5 | 1.11 | 1.8440 | 2.55 | 36.94 | 2.40 | 0.208 | 1.42 | 61.90 |
| PE 6 | 0.69 | 1.7518 | 10.94 | 412.96 | 1.49 | 0.299 | 9.74 | 54.37 |
| PE 7 | 0.33 | 1.6154 | 14.39 | 306.02 | 5.49 | 0.648 | 32.6 | 41.40 |
| PE 8 | 0.63 | 1.7063 | 11.81 | 311.37 | 2.32 | 0.217 | 13.7 | 57.77 |
| PE 9 | 0.61 | 1.7219 | 6.64 | 153.57 | 2.73 | 0.289 | 10.7 | 54.26 |
| PE 10 | 0.51 | 1.6546 | 10.58 | 424.45 | 1.92 | 0.263 | 10.9 | 54.56 |
| CPE1 | 1.04 | 1.6737 | 2.29 | 153.57 | 4.65 | 29333 | 30.3 | 80.48 |
| CPE2 | 0.63 | 1.7590 | 8.45 | 574.84 | 1.88 | 4.21 | 9.25 | 56.14 |
| CPE3 | 2.04 | 1.8954 | 4.98 | 51.90 | 1.81 | 0.287 | 70.6 | 83.71 |

FIG. 2

CARBON FIBER PAPER CONSTRUCTION AND MANUFACTURING PROCESS

BACKGROUND OF THE INVENTION (a) Field of the Invention

The present invention is related to a construction and manufacturing process of a carbon fiber paper, and more particularly, to a oxidized fiber needle-punched into an oxidized fiber felt, impregnated in low density resin, cured, and carbonized to avail the carbon fiber paper featuring high air permeability, low porosity, high flexure, and lower surface resistance.

(b) Description of the Prior Art

When compared to phosphoric acid fuel cell, the porous carbon electrode used by solid polymer fuel cell is highly demanded for its characteristics including gas and liquid diffusion, permeability, conductivity, strength, resilience, and durative compression strength. To seek a more compact size for the solid polymer fuel cell than that of the phosphoric acid fuel cell, the electrode must be made into a form of sheet or paper to reduce the volume of the cell.

To achieve the purpose, conventional paper making technology and method are currently adopted. Wherein, short carbon fibers are taken, and impregnated in thermally hardened resin during the curing process before the thermal treatment. However, thicker electrode used at the expense of resilience and comparatively higher porosity both contribute to damaged electrode when subject to pressure in the assembly of the cell. Furthermore, the conductivity is poor due to higher porosity among fibers and inconsistent due to uneven distribution of the fibers.

An improvement for the basic material for the porous carbonaceous electrode as disclosed in No. 7-142068(1995) Japanese patent involves mixing of carbonaceous milled fiber. However, the problem of lacking in resilience exists due to that the carbonaceous milled fiber is too thick to be applied in the solid polymer fuel cell.

No. 9-157052 (1997) Japanese patent discloses a manufacturing process for a porous carbon sheet; however, the conductivity of the electrode taught in the patent is very poor since its density is very low.

A basic material for porous carbon electrode that is resilient and highly conductive to be used in fuel cell and its manufacturing process disclosed in No. 489544 Taiwan patent (#6713034-2004 US Patent) adopts the wet paper making process. Wherein, short carbon fibers are first completely and consistently dispersed in the water before the addition of PVA short fibers serving as the adhesive for further complete and consistent dispersion to avail the carbon fiber paper by means of a sheet extrusion machine. The resultant paper is dipped in phenol resin, then pressed and cured to go through carbonization by batch within a temperature range of 1600~2000° C. to come up with the finished product of porous carbon fiber paper. However, fibers on the finished paper are blamed for chaos in arrangement and orientation making it vulnerable to inadequate strength in the orientation vertical to the arrangement of the fibers.

SUMMARY OF THE INVENTION

The primary purpose of the present invention is to provide a construction and manufacturing process of a carbon fiber paper featuring high air permeability, low porosity, high flexure and low surface resistance by having an oxidized fiber felt needle punched to increase interconnection points among fibers and intensity the arrangement and fineness of the fibers before being impregnated in organic low density resin, thermally pressed, cured and carbonized. To achieve the purpose, the manufacturing process of the present invention includes:

Felt making: multiple oxidized fibers are arrange for consistent dispersion, needle punched into an oxidized fiber felt in a thickness between 0.01 mm~50 mm and with a weight between 5~600 g/m$^2$;

Impregnation: the oxidized fiber felt is dipped in a low-density resin to get impregnated with the resin;

Curing: the impregnated felt is then heated up to 50~300° C. to go through the hot treatment by compression for the resin to get completely hardened, and the hot processed felt should have a thickness between 0.1~15 mm with a containment of oxidized fibers not less than 60% as of the total weight of the felt;

Carbonization: the hardened felt is then carbonized at a temperature of 700~3000° C. under the protection by inert gas; and Finished Product: oxidized fibers turn into carbon fibers while the resin, into a material with carbon structure after the carbonization to avail the conductive carbon fiber paper.

The composition and the manufacturing process of carbon fiber paper of the present invention is comprised of oxidized fiber and high density resin with the diameter of the oxidized fiber falling between 5~20 μm, the length between 0.1~15 cm and an LOI (Limited Oxygen Index) level not less than 40.

BRIEF DESCRIPTION OF THE DRAWINGS

FIG. 2 is a Table showing physical test results obtained by the subject invention;

DETAILED DESCRIPTION OF THE PREFERRED EMBODIMENTS

Figure 1:
FIG. 1 is a flow chart showing the manufacturing process of the present invention.
Figure 1:
Figure 1:
Figure 1:

Referring to FIG. 1 for a manufacturing process selected as the present invention, an oxidized fiber felt is used as the material for manufacturing of the carbon fiber paper of the present invention. The oxidized fiber felt is made of hot treated PAN fiber, asphalt fiber, phenol fiber or cellulose fiber. A fireproof oxidized fiber made of the refractory PAN fiber and the phenol fiber is preferred while the oxidized PAN fiber is the best option. The oxidized PAN fiber has a density between 1.2~1.6 g/cm3 and an LOI not less than 40 making it a powerful, combustion resistant fireproof fiber comprehensively applied in the making of fire garments and flameproof fiber products. By using the felt making technology, the oxidized fiber may be made into a felt with thickness and weight (gram per square yard) as desired. In the process of felt making, oxidized fibers are evenly dispersed and arranged while the needle-punch method is used to increase the weight and to control the thickness of the felt to allow increased interconnection points among the oxidized fibers and upgraded arrangement and fineness in every orientation, thus to increase conductivity, flexure, porosity and air permeability of the finished carbon fiber paper.

The oxidized fiber of the present invention is demanded to have a diameter between 5~20 μm, length between 0.1~15 cm, and LOI not less than 40. To prevent the oxidized fiber felt from falling off in the process of carbonization and to improve the adhesion among fibers, the oxidized fiber felt comprised of multiple short oxidized fibers is impregnated with high-density resin, a thermosetting or a thermoplastic one. The high-density resin in the process serves as an adhesive and is cured by heating and compression to make the oxidized fiber felt into a thickness as desired. Later, the felt is carbonized at a temperature range of 1000~3000° C.

In the course of impregnation with the resin, phenol resin, furan resin, polyimide resin are optional with the phenol resin preferred. After having being impregnated with resin, compressed and hardened, the ratios of weight and volume of the oxidized fiber as the total of the felt shall not be less than 60%.

Whereas the phenol resin is one of the materials in the making of synthetic graphite, also one popularly used as the basic material in the manufacturing of carbon/carbon compound materials. The primary purpose of the resin is to stick to the fibers and to function as a medium for heat and electricity conduction. During the stage of carbonization, oxidized fibers gradually turn into carbon fibers while the resin is substantially disintegrated and vaporized to leave pores, thus to improve air and water permeability.

When the resin impregnated oxidized fiber felt is compressed and hardened, the containment of resin is preferred at 0.01~50 wt %, and 0.2~40 wt %, more preferred. Whereas the conductivity of the resin when carbonized is not as good as that of the fiber, the resin containment is preferred at not less than 0.2 wt % and not greater than 30 wt % judging from the strength and conductivity of the finished carbon fiber paper as well as the maintenance of appearance.

The oxidized fiber felt after the impregnation of resin is cured by hot compression within a range of temperature preferred at 70~300° C. and the heating time is preferred from 30 seconds up to 12 hours to secure the sufficient curing for the resin before the carbonization.

The temperature range for the carbonization is preferred at 1000~3000° C. Both of the oxidized fiber and resin will experience change in their chemical structure in the process of carbonization. Wherein, the oxidized fiber will turn into carbon fiber; and the resin, a material containing carbon structure to yield good conductivity. The higher the temperature for the treatment of carbonization, the better the conductivity of the finished product will get.

In terms of the lamination of the cell plate, the thickness of the oxidized fiber felt used in the manufacturing of the basic material for the porous carbon electrode should be at 0.1~15 mm, and 0.1~6 mm preferred. Thickness less than 0.1 mm means that the strength in the orientation of the thickness is weaker; and greater than 10 mm, the total thickness of the lamination of cell plate is greater.

To increase conductivity of the carbon fiber paper, conductive substance such as carbon black, graphite powder, mesacarbon microbeads (MCMB), the vapor grown carbon fiber, or nano-carbon tube is admixed with resin in the impregnation process of the oxidized fiber felt. The amount of the admixture is preferred falling within the range of 0.1~20 wt % as of the total weight of the resin since any level lower than 0.1 wt %, the effect of changed conductivity is limited, or higher than 20 wt %, higher production cost.

Apparatus and methodology for testing the carbon fiber are described as follows:

Accupyc 1330 Pycnometer: Place a dried sample into the container of the Pysnometer and scale the weight of the sample. Pressurized helium is introduced into the Psynometer; wait until it reaches the equilibrium status; and solve the volume of the same using the equation of ideal gas status (PV=nRT) to avail the average density of the sample.

Determination of open porosity: pores in compound material are classified into two types, respectively, open pore and closed pore. According to ASTM D-570 test, the sample is placed in an oven at a constant temperature of 50±3° C. for 24 hours, then left cooled in a dry shallow container. When cooled, the sample is immediately put on a scale to measure its weight (W1) upon leaving the shallow container. The sample is then placed in DI water for 24 hours and removed to wipe to clean its surface for measuring its weight (W2). Finally, use the following formula to solve the open porosity (%):

$$\text{Open Porosity (\%)}=[(W2-W1-)/W1]\times 100$$

Flexural strength test of the carbon fiber paper: CY-6040A8 powerful tester manufactured by Jun Yen Precision Machinery Works is used for the test pursuant to 3-point load of ASTM-D790 based on the following conditions to solve the flexural or bending strength and the flexural or bending modulus Chuck rate: 0.5 mm/min $$\sigma_b=(3P_{max}L)/2bt^2$$

$$E_b=[(L/2)3/4bt^3](P/\delta)$$

Wherein,
$P_{max}$: maximal load (kg)
L: bridge span
b: width of the specimen
t: thickness of the specimen Surface Resistivity:

Test apparatus: Loresta GP Model MCP-T600

Using 4-pint probe test pursuant to JIS K 7194 with a standard size of 80×50 mm in thickness not greater than 20 mm.

The specimen is cut into proper size to directly measure its surface

Resistivity with the probe of the resistance meter.

$$\text{Surface Resistivity: } \rho_s=V/I\times RCF \text{ (RCF: Resistivity Correction Factor)}.$$

This present invention can be better understood by the following preferred embodiments.

In a first preferred embodiment (PE1), the oxidized PAN fiber produced by Toho Rayon in Japan is used as the material. The fibers each in diameter of 13~15 μm and 65 mm long with an LOI at 50~60 are needle punched into an oxidized fiber felt in weight of 330 g/m² and in thickness of 1.5 mm.

The felt is then dipped in phenol resin (Model PF-650, supplied by Chang Chun Synthetic Fiver Co., Taiwan), then dried at 70° C. for 15 minutes, matured at 170° C., hot compression treated for 15 minutes for the resin to get completely hardened. Wherein, the weight of the oxidized fibers is 99.7% as of the total weight of the felt. Under the protection by helium, the felt is carbonized up to 1300° C. to be made into a 0.67 mm thick, porous carbon fiber paper. FIG. 2 lists the results of the physical test of the carbon fiber paper. The carbon fiber paper to be used as the basic material for the porous carbon electrode gives excellent air permeability, flexural strength and constant conductivity.

In a second preferred embodiment (PE2) of the present invention, the resin impregnation and the hardening process for the oxidized fiber felt are the same as that done for the first preferred embodiment. After the hot hardening process, the felt is carbonized in the presence of nitrogen up to 2500° C. with the physical test results indicated in FIG. 2. By raising the temperature of carbonization, the basic material for the porous carbon electrode availed from the second preferred embodiment gives excellent conductivity, air permeability and porosity.

The resin impregnation and hardening process of the oxidized fiber felt for a third preferred embodiment (PE3) of the present invention are the same as that done for the first preferred embodiment. However, the resin containment in the third preferred embodiment is increased up to 30 wt %. After the hot hardening process, the felt is carbonized up to 1300° C. in vacuum with its test results as shown in FIG. 2. The increased containment of resin pays excellent flexural strength, air permeability and conductivity of a porous carbon electrode.

In a fourth preferred embodiment (PE4), an oxidized fiber of the same specification as that described in the first preferred embodiment is first added with 10 wt % carbon black (Model N-660, supplied by Korea Steel Chemical, Korea) and mixed well before the impregnation and hot compression hardening processes based on the same conditions as specified for the first preferred embodiment. The felt is then subject to the carbonization process to be heated up to 1300° C. with the results of physical test shown in FIG. 2. The addition of carbon black renders the porous carbon electrode better resilience, good conductivity and porosity.

Alternatively, the oxidized fiber felt in the same specification as that of the first preferred embodiment is added with 5 wt % of vapor grown carbon fiber (Model Pyreograh-III™ supplied by Applied Science, USA) to be well mixed with the resin before the impregnation and hot compression hardening processes based on the same conditions as specified for the first preferred embodiment. The felt is then subject to the carbonization process to be heated up to 1300° C. with the results of physical test shown in FIG. 2. The mixture of vapor grown carbon fiber gives the porous carbon electrode good conductivity and porosity.

In a sixth preferred embodiment (PE6) of the present invention using an oxidized fiber felt in same specification as that disclosed in the first preferred embodiment, 10 wt % of MCMB (Model GCSMB, Chinese Steel Carbon Chemical Co., Ltd.) is added first into the phenol resin to be well mixed with the resin before the impregnation and hot compression hardening processes based on the same conditions as specified for the first preferred embodiment. The felt is then subject to the carbonization process to be heated up to 1300° C. with the results of physical test shown in FIG. 2. The addition of MCBM gives the porous carbon electrode good flexural strength, porosity, conductivity and air permeability.

An oxidized fiber felt in thickness of 0.5 mm, thinner than but in a specification same as that given in the first preferred embodiment is used in a seventh preferred embodiment (PE7) of the present invention. The manufacturing process is the same as that applied in the first preferred embodiment with the physical characteristics of the finished product of porous carbon fiber paper as shown in FIG. 2. Change thickness gives the porous carbon electrode good flexural strength, air permeability and porosity.

Using an oxidized fiber felt in specification as same that of the first preferred embodiment of the present invention, an eighth preferred embodiment (PE8) of the present invention has a thermoplastic resin, BMI-H/DABPA polyimide resin (Model 5292, supplied by Ciba-Geigy, USA) is adopted for the impregnation. The impregnation, hardening, and carbonization processes are the same as that applied in the first preferred embodiment with the physical test results of the finished product of carbon fiber paper giving good flexural strength, conductivity, air permeability and porosity as shown in FIG. 2.

In a ninth preferred embodiment, an oxidized fiber felt of the same specification as that used in the first preferred embodiment (PE9) is first carbonized up to 1000° C. under the protection of nitrogen before undergoing resin impregnation, hot compression and carbonization as that done for the first preferred embodiment with the physical test results of the finished carbon fiber as shown in FIG. 2 to render good conductivity and air permeability for the finished product of the porous carbon electrode.

An oxidized fiber felt under the protection of nitrogen in a tenth preferred embodiment of the preferred embodiment (PE10) is carbonized up to 1300° C. before resin impregnation, hot compression and carbonization processes same as that done for the first preferred embodiment with the physical test results of the finished product of the carbon fiber paper as shown in FIG. 2 to give good conductivity, flexural strength and air permeability serving as the porous carbon electrode.

In a first comparative preferred embodiment (CPE1 in FIG. 2) of the present invention, the specification of the oxidized fiber felt, and impregnation and hot compression processes are the same as that applied in the first preferred embodiment; however, same with the presence of nitrogen, the carbonization is done only up to 600° C. According to FIG. 2 for the physical test results of the finished product of the carbon fiber paper, both of the flexural strength and conductivity are comparatively poor.

In a second comparative preferred embodiment (CPE2 in FIG. 2) of the present invention, the specification of the oxidized fiber felt, and impregnation and hot compression processes are the same as that applied in the first preferred embodiment; however, same with the presence of nitrogen, the carbonization is done only up to 1000° C. According to FIG. 2 for the physical test results of the finished product of the carbon fiber paper, the resultant conductivity is comparatively poor.

In a third comparative preferred embodiment (CPE3 in FIG. 2) of the present invention, the specification of the oxidized fiber felt, and impregnation and hot compression processes are the same as that applied in the first preferred embodiment; then the felt is matured at the temperature of 170° C. to be hot treated for 15 minutes without compression for the resin to get fully hardened before the carbonization at 1300° C. in the presence of nitrogen. The physical characteristics of the resultant carbon fiber paper shown in FIG. 2 indicate that the air permeability of the porous carbon electrode is too high.

Figure 3:
FIG. 3 is a microphotograph of the needle punched felt.
Figure 4:
FIG. 4 is a microphotograph showing orientation of the fiber felt completed with the needle-punch process.

The present invention by having oxidized fivers constantly arranged and dispersed for the making into a felt with increased weight and controlled thickness using the needle-punch method provides more interconnection points among the fibers and promotes the arrangement and fineness of the fibers in all orientations. FIG. 3 shows an electron microscopic phone of the needle-punched fiber felt. FIG. 4 is another picture taken by the electro microscope showing the orientation of the fibers marked of the fiber felt completed with the needle-punch process. From both photos, it appears that those interconnection points among the oxidized fibers of the needle-punched felt are increased, and both of the arrangement and fineness of the fibers are improved.

Accordingly, the resultant carbon fiber paper using the manufacturing process disclosed in the present invention provides multiple effects in achieving high air permeability, low porosity, high flexural strength and low surface resistance.

We claim:

1. A construction of a carbon fiber paper is comprised of carbon fiber and high-density resin with the diameter of the carbon fiber falling between 5~20 μm, length between 0.1~15 cm and LOI not less than 40.

2. The carbon fiber paper construction of claim 1, wherein the oxidized fiber felt is comprised of multiple thermally treated PAN, asphalt, phenol, or cellulose fibers.

3. The carbon fiber paper construction of claim 1, wherein the density of the oxidized fiber ranges between 1.2~1.6 g/cm$^3$.

4. The carbon fiber paper construction of claim 1, wherein the high-density resin is of a thermosetting or thermoplastic resin.

5. The carbon fiber paper construction of claim 1, wherein phenol, furan, or polyimide resin is selected as the high-density resin.

* * * * *